(12) United States Patent
Araki et al.

(10) Patent No.: US 10,837,938 B2
(45) Date of Patent: Nov. 17, 2020

(54) GAS SENSOR ELEMENT AND GAS SENSOR UNIT

(71) Applicant: DENSO CORPORATION, Kariya (JP)

(72) Inventors: Takashi Araki, Kariya (JP); Yusuke Todo, Kariya (JP)

(73) Assignee: DENSO CORPORATION, Kariya (JP)

( * ) Notice: Subject to any disclaimer, the term of this patent is extended or adjusted under 35 U.S.C. 154(b) by 83 days.

(21) Appl. No.: 15/850,173

(22) Filed: Dec. 21, 2017

(65) Prior Publication Data

US 2018/0172623 A1 Jun. 21, 2018

(30) Foreign Application Priority Data

Dec. 21, 2016 (JP) ................. 2016-248149

(51) Int. Cl.
*G01N 27/407* (2006.01)
*G01N 27/406* (2006.01)
(Continued)

(52) U.S. Cl.
CPC ....... *G01N 27/4072* (2013.01); *G01N 27/409* (2013.01); *G01N 27/4067* (2013.01);
(Continued)

(58) Field of Classification Search
CPC ....... G01N 27/404–407; G01N 27/409; G01N 27/419; G01N 27/41; G01N 27/4072; G01N 27/4067; G01N 27/4074; G01N 27/417
See application file for complete search history.

(56) References Cited

U.S. PATENT DOCUMENTS 4,498,968 A * 2/1985 Yamada ............... G01N 27/417
204/412
4,728,411 A * 3/1988 Mase .................. G01N 27/417
204/412
(Continued)

FOREIGN PATENT DOCUMENTS

DE 102008040175 A1 * 1/2010 ........... G01N 27/407
JP 2013-238584 11/2013
(Continued)

*Primary Examiner* — Gurpreet Kaur
(74) *Attorney, Agent, or Firm* — Nixon & Vanderhye P.C.

(57) ABSTRACT

A gas sensor device is equipped with a diffusion controlling portion, a pump cell, and a sensor cell. The diffusion controlling portion is formed to face a major surface of a solid electrolyte body and works to control a rate of diffusion of a measurement gas entering a measurement gas chamber. The pump cell has a pump electrode which contains gold and is formed on the major surface. The pump electrode is located downstream of the diffusion controlling portion in a gas flow direction. The pump cell works to regulate a concentration of oxygen in the measurement gas upon application of voltage to the pump electrode. The sensor cell has a sensor electrode formed on the major surface downstream of the diffusion controlling portion in the gas flow direction. The sensor cell works to measure a concentration of nitrogen oxide contained in the measurement gas upon application of voltage to the sensor electrode. The pump electrode is disposed upstream of the sensor electrode at a distance of 0.2 mm or more downstream away from the diffusion controlling portion in the gas flow direction. This enhances the accuracy in measuring the concentration of NOx.

2 Claims, 8 Drawing Sheets

(51) Int. Cl.
*G01N 27/409* (2006.01)
*G01N 27/419* (2006.01)
*G01N 27/417* (2006.01)
*G01N 27/41* (2006.01)

(52) U.S. Cl.
CPC .......... *G01N 27/41* (2013.01); *G01N 27/417* (2013.01); *G01N 27/419* (2013.01); *G01N 27/4074* (2013.01)

(56) References Cited

U.S. PATENT DOCUMENTS

| | | | | |
|---|---|---|---|---|
| 5,942,190 | A | * | 8/1999 | Kato ................. G01N 27/4074 204/425 |
| 2003/0205078 | A1 | * | 11/2003 | Hasei ................. G01N 27/4074 73/23.31 |
| 2005/0138989 | A1 | * | 6/2005 | Noda ................... G01N 27/407 73/31.05 |
| 2011/0083490 | A1 | | 4/2011 | Murakami et al. |
| 2015/0276657 | A1 | | 10/2015 | Sekiya et al. |
| 2015/0293051 | A1 | * | 10/2015 | Kajiyama .......... G01N 27/4075 204/424 |
| 2016/0209354 | A1 | * | 7/2016 | Araki .................... G01N 27/419 |
| 2016/0209358 | A1 | | 7/2016 | Toudou et al. |
| 2016/0320334 | A1 | | 11/2016 | Nakatou et al. |
| 2017/0191957 | A1 | | 7/2017 | Toudou et al. |
| 2017/0219516 | A1 | | 8/2017 | Toudou et al. |

FOREIGN PATENT DOCUMENTS

| | | |
|---|---|---|
| JP | 2016-008831 | 1/2016 |
| JP | 2016-008832 | 1/2016 |

\* cited by examiner

Side View

GAS SENSOR ELEMENT AND GAS SENSOR UNIT

CROSS REFERENCE TO RELATED DOCUMENT

The present application claims the benefit of priority of Japanese Patent Application No. 2016-248149 filed on Dec. 21, 2016, the disclosure of which is incorporated herein by reference.

BACKGROUND

Technical Field

This disclosure generally relates to a gas sensor device and a gas sensor unit including the same.

Background Art

Gas sensor devices in which a measurement gas chamber in which a measurement gas flows in a gas flow direction is defined by a solid electrolyte body are known as gas sensors constituting gas sensor units together with a control circuit for applied voltage control.

For instance, Japanese Patent First Publication No. 2015-200642 discloses a gas sensor device which is equipped with a pump cell, a sensor cell, and a diffusion-controlling portion. The pump cell of the sensor device works to regulate the concentration of oxygen in the measurement gas upon application of voltage to a pump electrode, while the sensor cell works to measure the concentration of nitrogen oxides (NOx) contained in the measurement gas upon application of voltage to a sensor electrode. The sensor device includes a solid electrolyte body. The solid electrolyte body has a first surface and a second surface opposed to each other. The first and second surfaces define a measurement gas chamber. The diffusion-controlling portion is formed between the pump electrode and the sensor electrode and faces the second surface to which the first surface on which the sensor electrode is formed is opposed. The diffusion-controlling portion works to control the diffusion of the measurement gas, thereby minimizing a reduction in sensitivity of an upstream portion of the sensor electrode in the gas flow direction.

The above gas sensor device has a second diffusion-controlling portion formed upstream of the pump electrode in the gas flow direction. The second diffusion-controlling portion faces the first surface which is opposed to the second surface to define the gas measurement chamber and on which the sensor electrode and the pump electrode are formed. This ensures the stability in initially controlling the concentration of oxygen whose diffusion has been controlled before reaching the sensor cell to improve the accuracy in measuring the concentration of NOx in the sensor cell.

The inventors, however, did hard research and have found that in the above gas sensor device, the pump electrode contains gold (Au), which leads to a reduction in accuracy in measuring the concentration of NOx. Specifically, the measurement gas which has passed the second diffusion-controlling portion facing the surface on which the pump electrode is formed hits an upstream portion of the pump electrode in the gas flow direction, thereby resulting in evaporation of Au. Adhesion of the evaporated Au to the sensor electrode will result in a decrease in ability thereof for decomposition activity against NOx, which leads to a reduction in accuracy in measuring the concentration of NOx using the sensor cell. It is thus required to eliminate such a drawback.

SUMMARY

It is an object of this disclosure to provide a gas sensor device and a gas sensor unit which improve the accuracy in measuring the concentration of NOx.

Technical means of the invention for achieving the object will be described below. The reference symbols noted in brackets recited in claims disclosing the technical means of the invention and this disclosure represent correspondence relations to specific means described in embodiments, as will be discussed later, and do not limit the technical field of the invention.

A gas sensor device (100, 200, 300) in the first mode, as disclosed in order to solve the above problem, which is designed to produce a flow of a measurement gas in a gas flow direction within a measurement gas chamber (10) defined by a major surface (71) of a solid electrolyte body (70). The gas sensor comprises a diffusion controlling portion (50, 10b) which is formed to face the major surface and works to control a rate of diffusion of the measurement gas entering the measurement gas chamber, a pump cell (40) which has a pump electrode (41) which contains gold, is formed on the major surface, and located downstream of the diffusion controlling portion in the gas flow direction, the pump cell working to regulate a concentration of oxygen in the measurement gas upon application of voltage to the pump electrode, and a sensor cell (20) which has a sensor electrode (21) formed on the major surface downstream of the diffusion controlling portion in the gas flow direction, the sensor cell working to measure a concentration of nitrogen oxide contained in the measurement gas upon application of voltage to the sensor electrode. The pump electrode is disposed at a place (Sp) which is located upstream of the sensor electrode and at a distance of 0.2 mm or more downstream away from the diffusion controlling portion in the gas flow direction.

A gas sensor unit in the second invention, as disclosed in order to solve the above problem, comprises a gas sensor device (100, 200, 300) of the first invention, a sensor housing (101) which has the gas sensor device retained therein, a device cover (103) which is secured to the sensor housing to cover an upstream device end portion (100a) of the gas sensor device in the gas flow direction, the device cover directing the measurement gas to the upstream device end portion, and a sensor control circuit (106) which controls application of voltage to the pump electrode and the sensor electrode.

According to the first and second mode, the measurement gas which has passed through the diffusion controlling portion facing the major surface of the solid electrolyte body on which the pump electrode is formed diffuses within the measurement gas chamber before reaching the place which is 0.2 mm or more away from the diffusion controlling portion downstream in the gas flow direction. This decreases a probability that after passing through the diffusion controlling portion, the measurement gas locally hits an upstream portion of the pump electrode. This minimizes the evaporation of Au upstream of the sensor electrode in the gas flow direction, thereby reducing adhesion of evaporated Au to the sensor electrode on the major surface on which the pump electrode is also formed which usually lead to a deterioration in decomposition activity against NOx. This improves the accuracy of the sensor cell in measuring the concentration of NOx.

EMBODIMENT FOR CARRYING OUT THE INVENTION

A plurality of embodiments will be described below with reference to the drawings. The same reference numbers will be used for the same parts in the several embodiments, and the same explanation thereof in detail may be omitted. When only part of the components in each embodiment are described, the explanation of the components already made in another embodiment may be applied thereto. The components described in the several embodiments may alternatively be partially combined in another way without being specified.

First Embodiment

Figure 1:
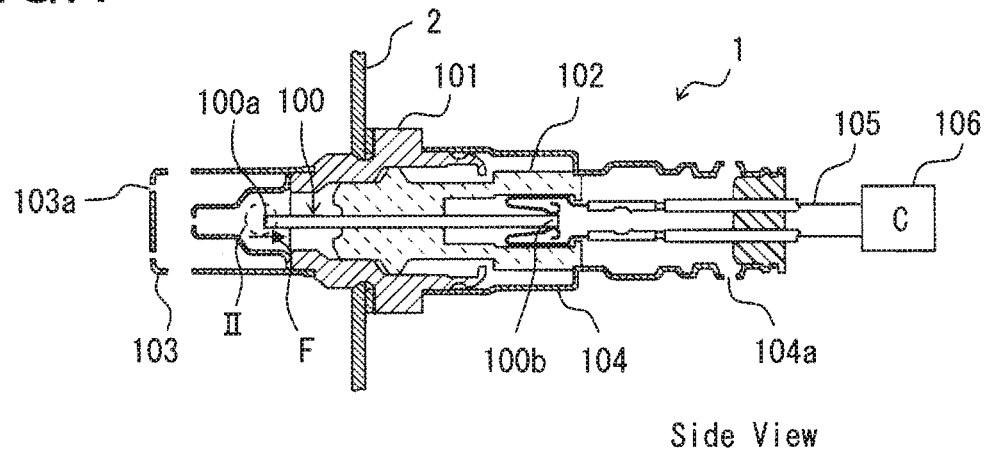
FIG. 1 is a sectional view which illustrates a gas sensor unit according to the first embodiment.

The gas sensor unit 1 in the first embodiment is, as illustrated in FIG. 1, disposed in the exhaust path 2 of an internal combustion engine of a vehicle. Exhaust gas flowing through the exhaust path 2 enters the gas sensor unit 1 as a measurement gas. The gas sensor unit 1 measures the concentration of NOx in the measurement gas using the gas sensor device 100 installed therein. Specifically, the gas sensor unit 1 includes the sensor housing 101, the porcelain insulator 102, the covers 103 and 104, the sensor harnesses 105, and the sensor control circuit 106 in addition to the gas sensor device 100. "F" in FIG. 1 represents a direction in which the measurement gas flows in the gas sensor device 100.

The sensor housing 101 retains therein the gas sensor device 100 through the porcelain insulator 102. The covers 103 and 104 are secured to the sensor housing 101. The device cover 103 covers an outer periphery of the upstream device end portion 100a of the gas sensor device 100 in the gas flow direction F. The device cover 103 has gas inlet holes 103a through which the measurement gas is admitted from the exhaust path 2 to the upstream device end portion 100a. The cover 104 covers an outer periphery of the downstream device end portion 100b of the gas sensor device 100 in the gas flow direction F. The cover 104 has the air inlet holes 104a through which atmospheric air is admitted to the downstream device end portion 100b. The sensor harnesses 105 extend from outside to inside the cover 104. The sensor control circuit 106 is disposed outside the sensor housing 101 and the covers 103 and 104 and connected to the gas sensor device 100 through the sensor harnesses 105.

Gas Sensor Device

The structure of the gas sensor device 100 will be described below in detail.

Figure 2:
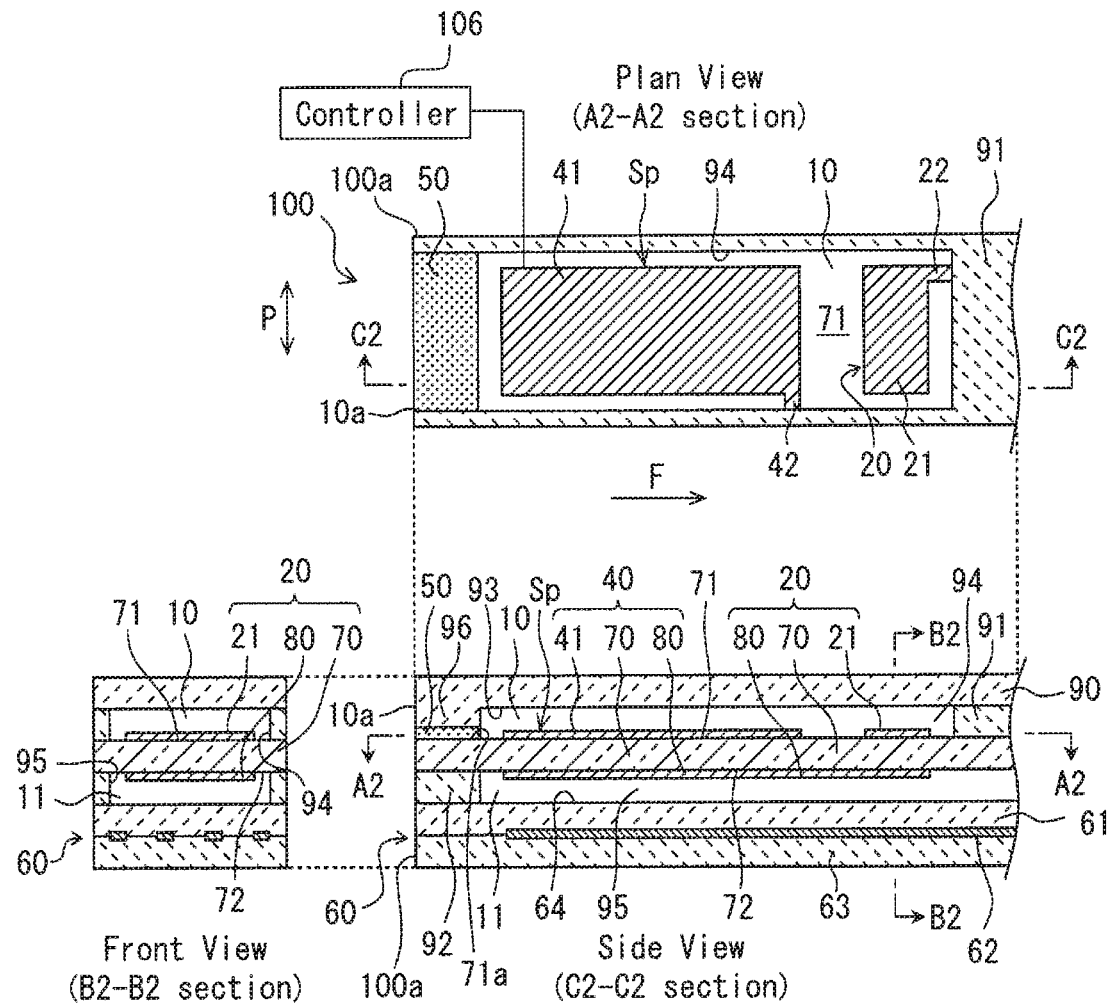
FIG. 2 is a sectional view which shows a II part of a gas sensor device in FIG. 1.

The gas sensor device 100 is, as illustrated in FIG. 2, produced by placing the insulating layer 90 on a first end portion of the solid electrolyte body 70 through the first spacer 91 and stacking the heating structural body 60 through the second spacer 92 on a second end portion of the solid electrolyte body 70 which is opposed to the first end portion.

The solid electrolyte body 70 is made of a solid electrolyte material, such as yttria-stabilized zirconia (YSZ), in the shape of a rectangular plate. The solid electrolyte body 70 exhibits oxygen-iron conductivity when it is placed at high temperature (e.g., about 600° C. or more in case of YSZ). When heated by the heater 62 which will be described later, the solid electrolyte body 70 exhibits the oxygen-ion conductivity. The solid electrolyte body 70 is formed to have the first major surface 71 and the second major surface 72 which are opposed to each other and flat.

The insulating layer 90 and the first spacer 91 are made of an electrically insulating material such as alumina ($Al_2O_3$). The insulating layer 90 formed in the shape of a rectangular plate has the second surface 93 which faces the first major surface 71 that is the first surface of the solid electrolyte body 70 through the first spacer 91. The first spacer 91 has an opening in the form of a C-shaped plate in a planar view. The measurement gas chamber 10 is defined between the first major surface 71 of the solid electrolyte body 70 and the second surface 93 of the insulating layer 90. The measurement gas chamber 10 is formed in a box-shape with an opening which is not surrounded by the inner peripheral surface 94 of the first spacer 91. In other words, the measurement gas chamber 10 is defined by the first major surface 71, the second surface 93, and the inner peripheral surface 94 and has an opening portion as the inlet hole 10a.

The exhaust gas that is the measurement gas is introduced into the inlet hole 10a of the measurement gas chamber 10 through the gas inlet holes 103a of the device cover 103. The end of the gas sensor device 100 to which the inlet hole 10a opens is the upstream device end portion 100a. The measurement gas entering the inlet hole 10a flows away from the inlet hole 10a along the first major surface 71 in the gas flow direction F.

The heating structural body 60 is made by retaining the heater 62 between the heating base plate 61 and the insulating base plate 63. The base plates 61 and 63 are made of an electrical insulating material such as $Al_2O_3$ in the shape of a rectangular plate. The heater 62 is made of an electrical conducive material such as platinum (Pt) in the shape of a rectangular thin film. The heater 62 is connected to the sensor control circuit 106 through the sensor harness 105.

The heater 62 is supplied with electrical power from the sensor control circuit 106 to produce heat.

The second spacer 92 is made of an electrical insulating material such as alumina ($Al_2O_3$). The heating base plate 61 has the heat dissipating surface 64 which is opposed to the second major surface 72 of the solid electrolyte body 70 through the second spacer 92. The second spacer 92 has an opening in the form of a C-shaped plate in a planar view. The reference gas chamber 11 is, therefore, formed between the second major surface 72 of the solid electrolyte body 70 and the heat dissipating surface 64 of the heating base plate 61 in a rectangular box shape with an opening not surrounded by the inner peripheral surface 95 of the second spacer 92. In other words, the reference gas chamber 11 is defined by the second major surface 72, the heat dissipating surface 64, and the inner peripheral surface 95 and an opening portion as a reference inlet (not shown).

The air is introduced as a reference gas into the reference inlet of the reference gas chamber 11 through the air inlet holes 104a of the cover 104. The end of the gas sensor device 100 which is opposed to the inlet hole 10a and to which the reference inlet opens is the downstream device end portion 100b.

With the above described stacked structure, the gas sensor device 100 constructs the diffusion controlling portion 50, the sensor cell 20, and the pump cell 40 and is also equipped with the heater 62.

The diffusion controlling portion 50 is made of a porous material such as alumina ($Al_2O_3$) in the shape of a rectangular thin film having a thickness of, for example, 15 μm. The diffusion controlling portion 50 is disposed to face the most upstream portion 71a of the first major surface 71 of the solid electrolyte body 70. The first major surface 71 is exposed to the measurement gas chamber 10 in a rectangular shape. The most upstream portion 71a is a portion of the first major surface 71 which is most upstream in the gas flow portion F and surrounds the inlet hole 10a. In the first embodiment, the diffusion controlling portion 50 is in contact with the most upstream portion 71a. With these arrangements, the diffusion controlling portion 50 permits the measurement gas which contains NOx and oxygen and has entered the inlet hole 10a to pass therethrough. The diffusion controlling portion 50 also provides a flow resistance to the measurement gas to control the rate of diffusion of the measurement gas to the measurement gas chamber 10. A portion of the inlet hole 10a which is unoccupied by the diffusion controlling portion 50 is occupied by the closing wall 96 that is a portion of the insulating layer 90 protruding from the second surface 93 in the shape of a rectangular upright plate, thereby blocking the passage of the measurement gas. The diffusion controlling portion 50, therefore, works as a diffusion controlling layer between the closing wall 96 and the first major surface 71 to achieve the diffusion control.

The cells 20 and 40 share the solid electrolyte body 70 and the reference electrode 80 with each other. The reference electrode 80 is made of an electrical conductive material containing Pt in the shape of a rectangular thin film having a thickness of, for example, 10 μm. The reference electrode 80 is disposed on a portion of the second major surface 72 of the solid electrolyte body 70 downstream of the diffusion controlling surface 72 in the gas flow direction F. The second major surface 72 is exposed to the reference gas chamber 11 in a rectangular shape. The reference electrode 80 extends over the cells 20 and 40. The reference electrode 80 is connected to the sensor control circuit 106 through the sensor harness 105. The reference electrode 80 is, therefore, exposed to the air entering the reference gas chamber 11 and develops a reference potential when the concentration of NOx is measured.

The sensor cell 20 includes the sensor electrode 21 in addition to the parts 70 and 80 shared with the pump cell 40. The sensor electrode 21 is made of an electrical conductive material which contains Pt and rhodium (Rh) to enhance decomposition activity against NOx and shaped in the form of a rectangular thin film. The sensor electrode 21, thus, develops catalytic activity against NOx molecules. The sensor electrode 21 is disposed on a portion of the first major surface 71 of the solid electrolyte body 70 which is located downstream of the diffusion controlling portion 50 in the gas flow direction F. The sensor electrode 21 is opposed to a portion of the reference electrode 80 through a portion of the solid electrolyte body 70. With these arrangements, the sensor electrode 21 has lead 22 extending downstream in the gas flow direction F. The lead 22 is connected to the sensor control circuit 106 through the sensor harness 105.

With the above arrangements, the sensor cell 20 functions to measure the concentration of NOx in the measurement gas. Specifically, the sensor control circuit 106 applies a controlled voltage between the electrodes 21 and 80 of the sensor cell 20. Upon application of such a voltage, the NOx molecules in the measurement gas entering the measurement gas chamber 10 are adsorbed by an exposed noble-metal surface of the sensor electrode 21 and then subjected to a catalytic operation, so that they are decomposed into nitrogen ions and oxygen ions. The oxygen ions are transmitted from inside the sensor electrode 21 to the solid electrolyte body 70 and then to the reference electrode 80. The oxygen ions are then measured in the form of a sensor current. The magnitude of the measured sensor current is used to determine the concentration of NOx contained in the measurement gas.

The pump cell 40 is equipped with the pump electrode 41 in addition to the parts 70 and 80 shared with the sensor cell 20. The pump electrode 41 is made of an electrical conductive material which contains Au and Pt to have a decreased degree of decomposition activity against NOx molecules in the form of a rectangular thin film having a thickness of, for example, 10 μm. The pump electrode 41, therefore, develops the reduction of oxygen molecules. The pump electrode 41 is, like the sensor electrode 21, disposed on a portion of the first major surface 71 of the solid electrolyte body 70 which is located downstream of the diffusion controlling portion 50 and upstream of the sensor electrode 21 in the gas flow direction F. The pump electrode 41 is opposed to a portion of the reference electrode 80 through a portion of the solid electrolyte body 70. With these arrangements, the pump electrode 41 has the lead 42 extending in a direction P perpendicular to the gas flow direction F. The lead 42 is connected to the sensor control circuit 106 through the sensor harness 105.

With the above arrangements, the pump cell 40 functions to regulate the concentration of oxygen contained in the measurement gas. Specifically, the sensor control circuit 106 applies a controlled voltage between the electrodes 41 and 80 of the pump cell 40. Upon application of such a voltage, the oxygen molecules in the measurement gas entering the measurement gas chamber 10 are adsorbed by an exposed noble-metal surface of the pump electrode 41 and then subjected to a reduction operation, so that they are decomposed into oxygen ions. The oxygen ions are transmitted from inside the pump electrode 41 to the solid electrolyte body 70, to the reference electrode 80, and then discharged into the reference gas chamber 11. Such a pumping operation decreases or removes the oxygen molecules from the measurement gas, thereby regulating the concentration of oxygen in the measurement gas.

The sensor cell 20 works to output to the sensor control circuit 106 the sensor current whose value is as a function of the concentration of NOx in the measurement gas after the concentration of oxygen thereof is regulated by the pump cell 40. The sensor control circuit 106 is responsive to the output from the sensor cell 20 to calculate the concentration of NOx.

The heater 62 is laid to overlap the cells 20 and 40 in a planar view (not shown). This causes heat, as produced by the heater 62, to be transmitted to the heating base plate 61 and then emitted from the heat dissipating surface 64. The heat emitted from the heat dissipating surface 64 is transmitted to the parts 80, 70, 21, and 41 of the cells 20 and 40 through the reference gas chamber 11, thereby heating the cells 20 and 40. In the first embodiment, the heating center of the heater 62 at which the temperature of the heater 62 becomes highest is located closer to the pump electrode 41 than to the sensor electrode 21 in the gas flow direction F, thereby causing the pump electrode 41 to be kept by the heater 62 at a temperature (e.g., 800° C.) higher than that (e.g., 600° C.) at which the sensor electrode 21 is kept.

Positional Relation Among Components

The positional relation among the electrodes 21 and 14 of the cells 20 and 40 and the diffusion controlling portion 50 will be described below as positional relation among the parts of the gas sensor device 100.

Figure 3:
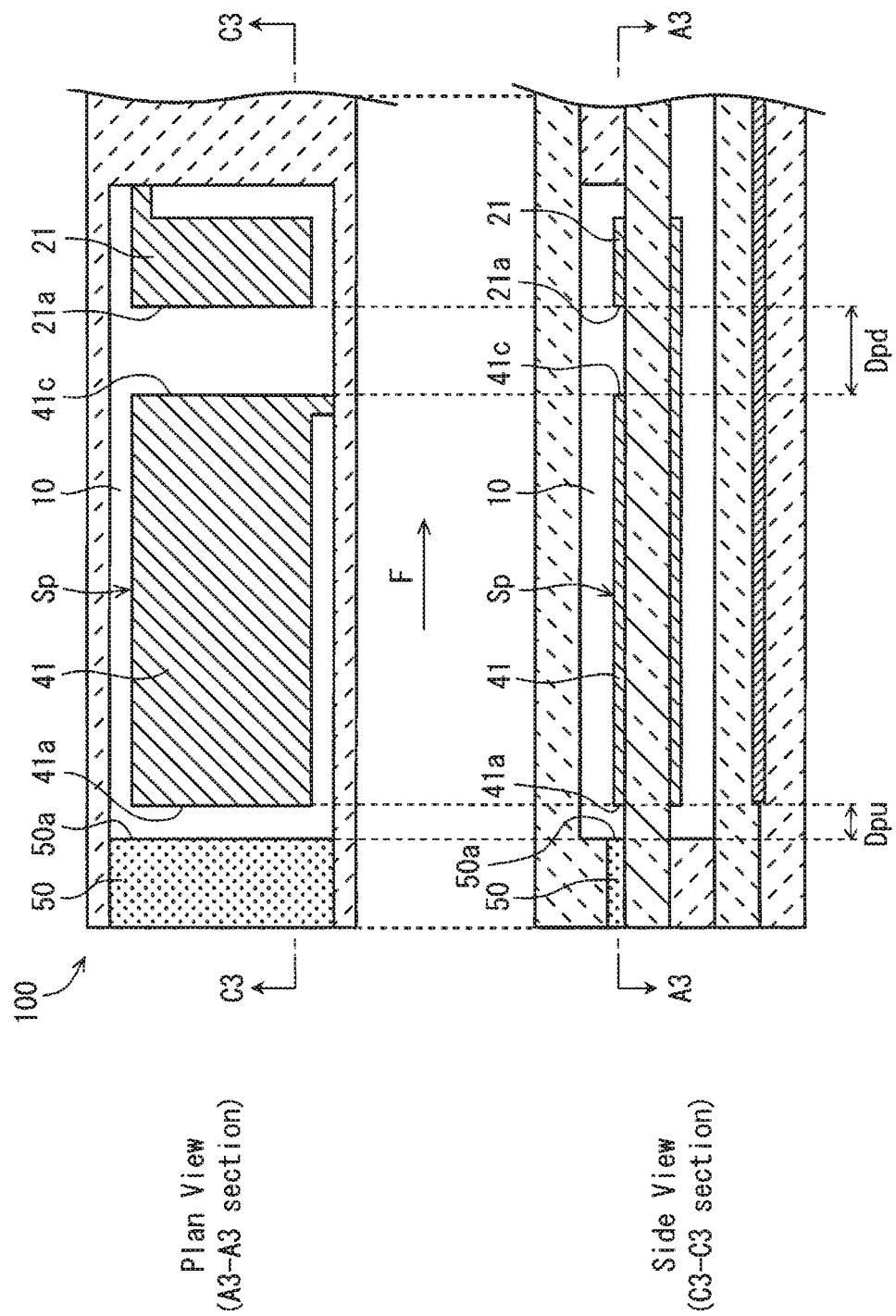
FIG. 3 is a schematic view which represents a positional relation among component parts of a gas sensor device in the first embodiment.

The pump electrode 41 is, as can be seen in FIG. 2, disposed at a place Sp which is located upstream of the sensor electrode 21 and downstream of the diffusion controlling portion 50 in the gas flow direction F within the measurement gas chamber 10. Specifically, the place Sp is, as illustrated in FIG. 3, an area which is located at a given distance Dpu away from the diffusion controlling portion 50 to the downstream side in the gas flow direction F and in which the pump electrode 41 is formed. The distance Dpu is selected as a minimum distance between the downstream end surface 50a of the diffusion controlling portion 50 and the upstream end surface 41a of the pump electrode 41 in the gas flow direction F. The upstream end surface 41a of the pump electrode 41 arranged at the place Sp is located at an interval of 0.2 mm or more (i.e., the distance Dpu) away from the downstream end surface 50a of the diffusion controlling portion 50. The reasons why the distance Dpu is selected to be 0.2 mm or more will be described below.

Figure 4:
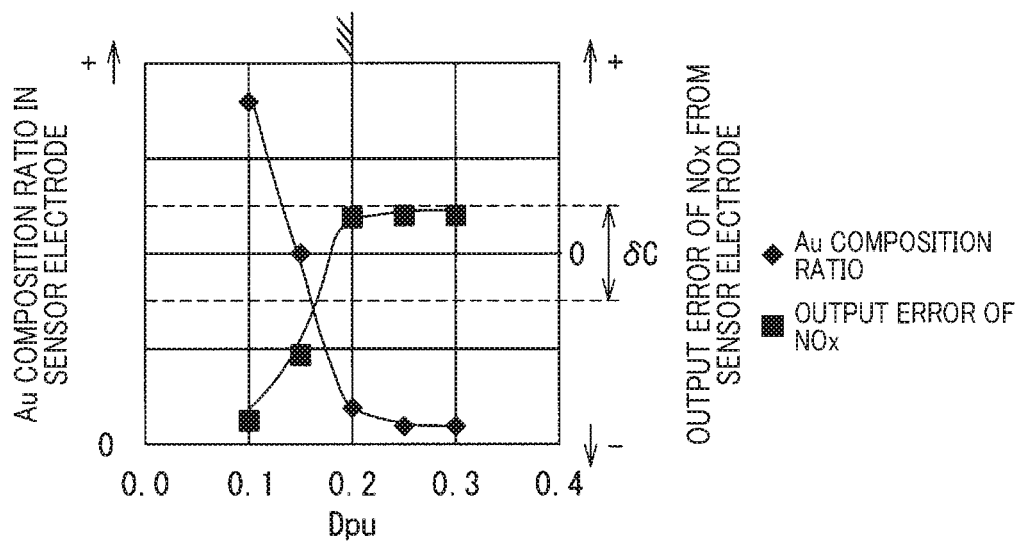
FIG. 4 is a graph which represents a correlation between a distance in a gas sensor device of the first embodiment, a surface composition percentage of a sensor electrode, and an output error from the sensor electrode.

The inventors of this application searched a surface composition of the sensor electrode 21 and an output error of the sensor electrode 21 for difference values of the distance Dpu, as demonstrated in FIG. 4, in order to find adverse effects of the distance Dpu on the evaporation of Au from the pump electrode 41 and adhesion of Au to the sensor electrode 21. FIG. 4 represents the surface composition percentage after the electrodes 41 and 21 are exposed to air at 800° C. for 200 hours and the output error when the electrodes 41 and 21 are exposed to a test gas in which the concentration of NOx is 100 ppm at 800° C. after the above air-exposure. The surface composition percentage in FIG. 4 is expressed by an average of percentages by weight of Au composition (i.e., wt % of Au) in a plurality of areas, as each defined by a circle having a diameter of 0.4 mm on the surface of the sensor electrode 21. The percentages by weight are derived using X-ray photoelectron spectroscopy (XPS). The output error in FIG. 4 is expressed by a difference between the concentration of NOx that is a function of the sensor current outputted from the sensor electrode 21 and the concentration of NOx (i.e., 100 ppm) in the test gas. "δC" indicates an allowable range of the output error.

Figure 5:
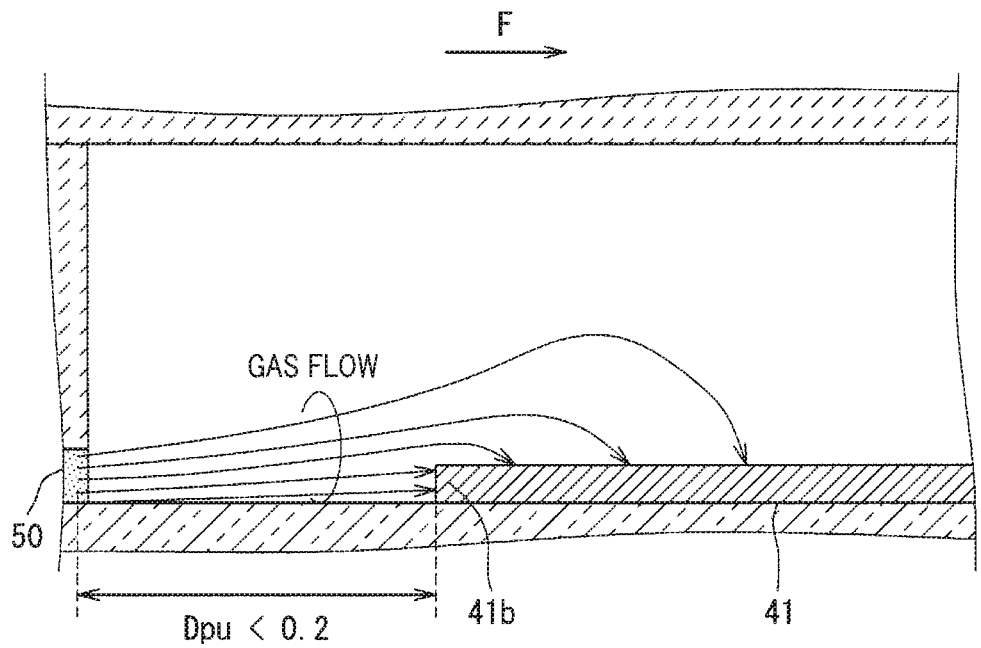
FIG. 5 is a schematic view which shows a gas flow in a comparative example for the first embodiment.

The results in FIG. 4 show that when the distance Dpu is less than 0.2 mm, the Au composition percentage of the sensor electrode 21 increases, in other words, the amount of Au adhered to the sensor electrode 21 increases. This results in an increase in output error of the sensor electrode 21 to increase (in FIG. 4, the output error increases to the minus side smaller than the concentration of NOx in the test gas). This is thought of as being because it is easy for the test gas after passing through the diffusion controlling portion 50, as denoted by arrows representing flows of gas in FIG. 5, to reach the upstream portion 41b of the pump electrode 41 which is located at a distance of less than 0.2 mm downstream away from the diffusion controlling portion 50 in the gas flow direction F. It becomes easy for Au to evaporate from the upstream portion 41b the test gas reaches and then adheres to the sensor electrode 21, which may lead to an increase in the output error.

Figure 6:
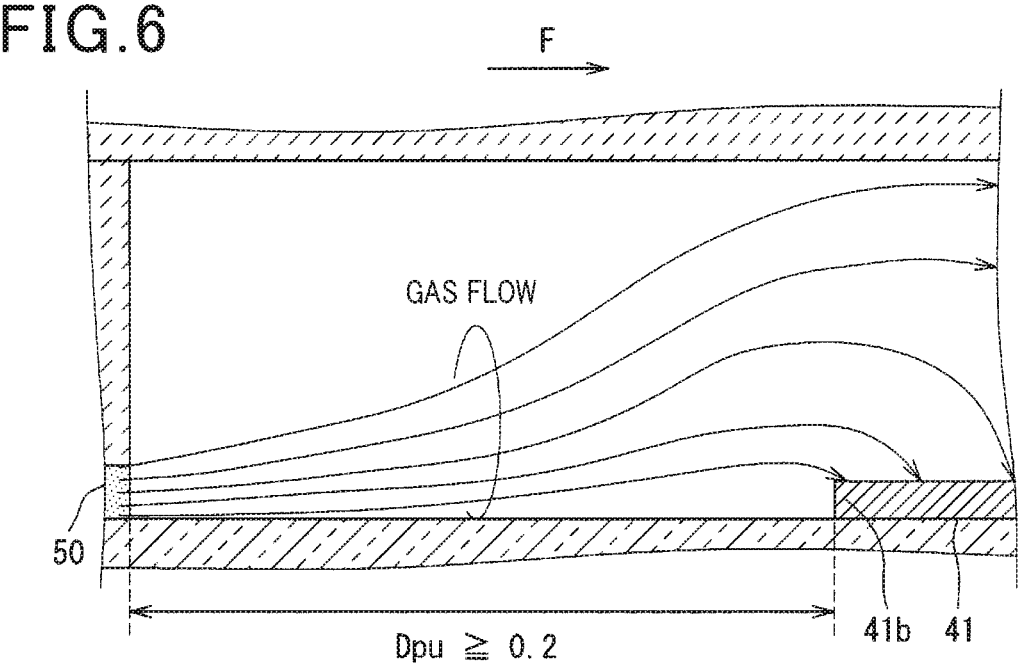
FIG. 6 is a schematic view which illustrates a gas flow in the first embodiment.

FIG. 4 shows that when the distance Dpu is 0.2 mm or more, the Au composition percentage of the sensor electrode 21 greatly decreases, that is, the amount of Au adhered to the sensor electrode 21 greater decreases. This causes the output error of the sensor electrode 21 to decrease to within the allowable range δC. This is thought of as being because the test gas after passing through the diffusion controlling portion 50, as denoted in FIG. 6 by arrows representing flows of gas in the first embodiment, hardly locally reaches the upstream portion 41b of the pump electrode 41 which is located at a distance of 0.2 mm or more downstream away from the diffusion controlling portion 50 in the gas flow direction F. It is becomes difficult for Au to evaporate from the upstream portion 41b of the test gas hardly reaches. This results in a decrease in evaporated Au reaching and adhering to the sensor electrode 21, which leads to a decrease in the output error.

The space Sp, as defined by the distance Dpu, is also determined in the first embodiment, as illustrated in FIG. 3, by the distance Dpd at which the pump electrode 41 is located upstream away from the sensor electrode 21 in the gas flow direction F. The distance Dpd is a minimum interval between the upstream end surface 21a of the sensor electrode 21 and the downstream end surface 41c of the pump electrode 41 in the gas flow direction F. The downstream end surface 41c of the pump electrode 41 lying at the place Sp is arranged at an interval of 0.3 mm to 0.7 mm, that is, a distance of 0.3 mm or more to 0.7 mm or less (i.e., the distance Dpd) away from the upstream end surface 21a of the sensor electrode 21. When the distance Dpd is less than 0.3 mm, it result in a risk that a leakage current occurs between the sensor electrode 21 and the pump electrode 41, which results in a decrease in measurement accuracy of the gas sensor unit 1. The distance Dpd is, therefore, selected to be 0.3 mm or more. Alternatively, when the distance Dpd is more than 0.7 mm, it results in a risk that the size of the gas sensor device 100, i.e., the gas sensor unit 1, is increased, thus resulting in an increase in manufacturing costs thereof. The distance Dpd is, therefore, selected to be 0.7 mm or less.

Operation and Effects

The operation and effects of the first embodiment will be described below.

In the first embodiment, the measurement gas which has passed through the diffusion controlling portion 50 facing the first major surface 71 of the solid electrolyte body 70 on which the pump electrode 41 is formed diffuses within the measurement gas chamber 10 before reaching the place Sp which is 0.2 mm or more away from the diffusion controlling portion 50 downstream in the gas flow direction F. This decreases a probability that after passing through the diffusion controlling portion 50, the measurement gas locally hits the upstream portion 41b of the pump electrode 41 at the place Sp. This minimizes the evaporation of Au upstream of the sensor electrode 21 in the gas flow direction F, thereby reducing adhesion of evaporated Au to the sensor electrode 21 on the first major surface 71 on which the pump electrode 41 is also formed which usually lead to a deterioration in decomposition activity against NOx. This improves the accuracy of the sensor cell 20 in measuring the concentration of NOx.

In a case where the exhaust gas emitted from an internal combustion engine is the measurement gas in the first embodiment, it is desirable to introduce the measurement gas into the gas sensor unit 1 from a portion of the exhaust path 2 near the cylinder in which the exhaust gas is created in order to improve the accuracy in measuring the concentration of NOx. This, however, results in a risk that the high-temperature measurement gas, as introduced from the exhaust path 2 into the measurement gas chamber 10, hits the pump electrode 41 downstream of the diffusion controlling portion 50 in the gas flow direction F, thereby facilitating the evaporation of Au. The high-temperature measurement gas, however, will diffuse before reaching the pump electrode 41 which is located 0.2 mm or more away from the diffusion controlling portion 50 downstream in the gas flow direction F, thereby minimizing the evaporation of Au. This enhances the measurement accuracy of the gas sensor unit 1.

In the first embodiment, when the heater 62 heats the pump cell 40 and the sensor cell 20, the temperature of the pump electrode 41 becomes higher than that of the sensor electrode 21. When the temperature of the exhaust gas entering the measurement gas chamber 10 as the measurement gas is excessively increased by some disturbance, it will result in an increased degree of evaporation of Au from the pump electrode 41 whose temperature is increased by exposure to the measurement gas to be more than that increased by the heater 62. However, the pump electrode 41 whose temperature is increased to be more than that increased by the heater 62 is located 0.2 mm or more away from the diffusion controlling portion downstream in the gas flow direction F, thereby enhancing the diffusion of the measurement gas before reaching the pump electrode 41, thereby reducing the evaporation of Au to improve the measurement accuracy of the gas sensor unit 1.

In the first embodiment, there is a low probability that the leakage current occurs between the sensor electrode 21 and the pump electrode 41 which is 0.3 to 0.7 mm away from the sensor electrode 21 upstream in the gas flow direction F, thereby enabling the size of the gas sensor device 100 and the gas sensor unit 1 to be reduced to decrease the production costs thereof.

Second Embodiment

Figure 7:
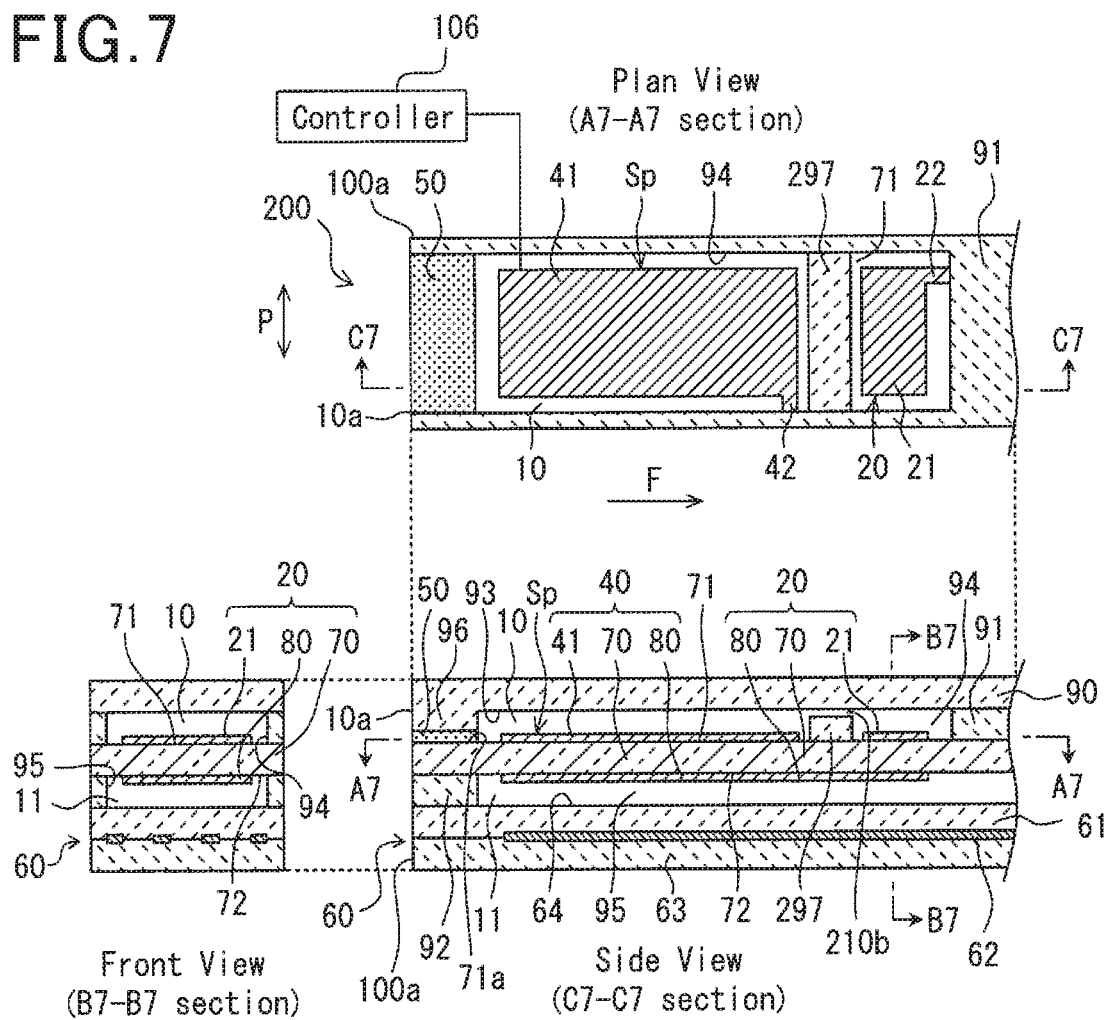
FIG. 7 is a sectional view which illustrates a gas sensor device according to the second embodiment and corresponds to FIG. 2.

The second embodiment is, as can be seen in FIG. 7, a modification of the first embodiment.

The gas sensor device 200 of the second embodiment is equipped with the protruding wall 297. Specifically, the protruding wall 297 is made of an electrical insulating material, such as alumina ($Al_2O_3$), in the shape of a rectangular upright plate. The protruding wall 297 is disposed on the first major surface 71 of the solid electrolyte body 70 on which the electrodes 21 and 41 are disposed and located downstream of the pump electrode 41 and upstream of the sensor electrode 21 in the gas flow direction F. In other words, the protruding wall 297 is disposed downstream of the diffusion controlling portion 50 in the gas flow direction F and interposed between the pump electrode 41 at the place Sp and the sensor electrode 21. The protruding wall 297 extends from the first major surface 71 of the solid electrolyte body 70 to a level below the second surface 93 of the insulating layer 90 so as to have an air gap 210b of, for example, 15 µm between itself and the second surface 93. The protruding wall 297, thus, works to limit the flow of the measurement gas except for the air gap 210b that is a portion of the measurement gas chamber 10 and faces the second surface 93 and also to give a flow resistance to the measurement gas in the air gap 210b to control the rate of diffusion of the measurement gas in the measurement gas chamber 10.

In the second embodiment, the protruding wall 297 extending from the first major surface 71 of the solid electrolyte body 70 between the pump electrode 41 and the sensor electrode 21 in the gas flow direction F is laid to create the air gap 210b between itself and the second surface 93 which faces the first major surface 71 and defines the measurement gas chamber 10. The air gap 210b works to control the rate of diffusion of the measurement gas and facilitates the adhesion of Au evaporated from the pump electrode 41 to the surface of the protruding wall 297 or the second surface 93. This minimizes the adhesion of evaporated Au to the sensor electrode 21 located downstream of the air gap 210b in the gas flow direction F which will lead to a deterioration in decomposition activity against NOx. This enhances the measurement accuracy of the gas sensor device 200.

Third Embodiment

Figure 8:
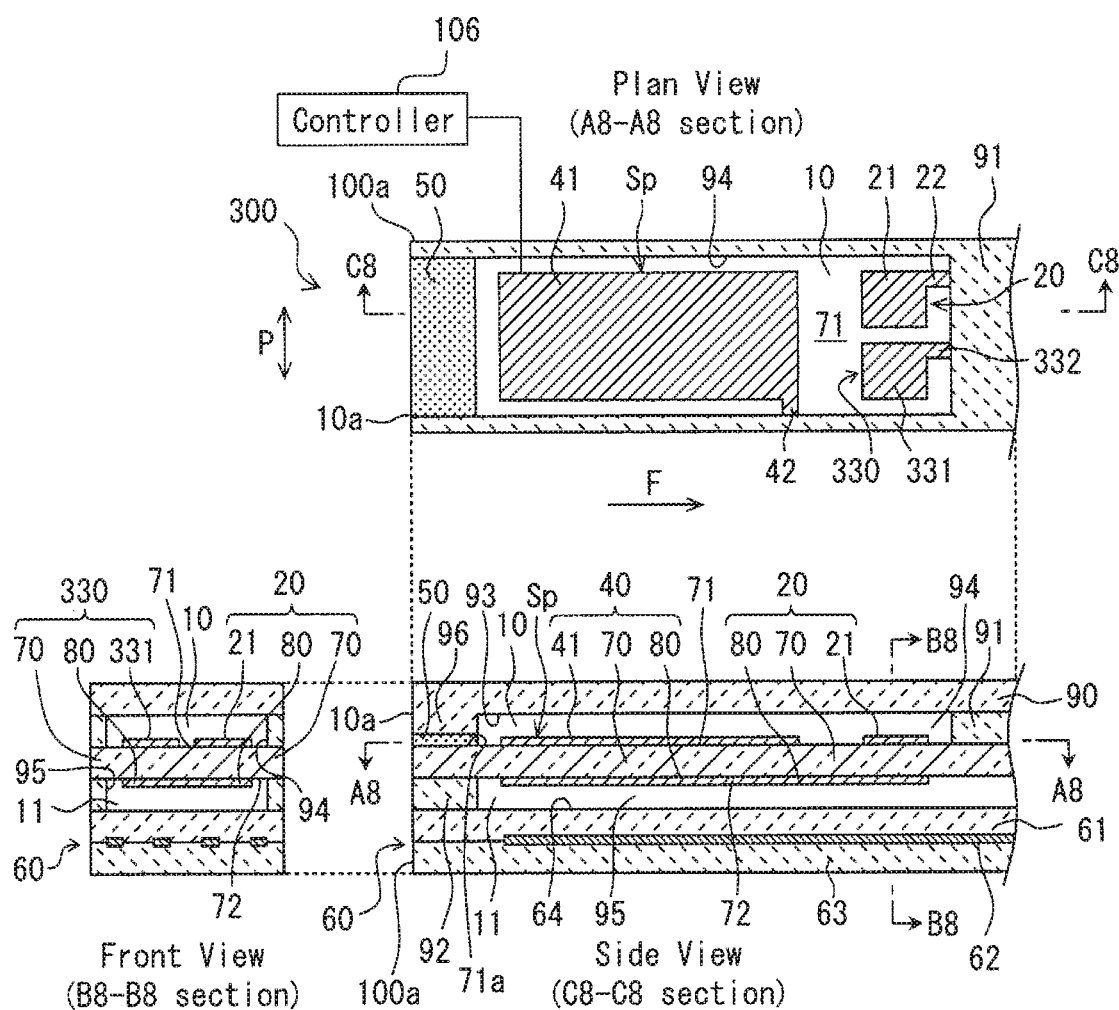
FIG. 8 is a sectional view which illustrates a gas sensor device according to the third embodiment and corresponds to FIG. 2.

The third embodiment is, as can be seen in FIG. 8, a modification of the first embodiment.

The gas sensor device 300 of the third embodiment is also equipped with the monitor cell 330 which is laid to overlap the heater 62 in a planar view (not shown). Specifically, the monitor cell 330 includes the monitor electrode 331 in addition to the parts 70 and 80 shared with the cells 20 and 40. The monitor electrode 331 is made of an electrical conductive material which contains Au and Pt to have a decreased degree of decomposition activity against NOx molecules in the form of a rectangular thin film having a thickness of, for example, 10 µm. The monitor electrode 331, therefore, develops the reduction of oxygen molecules.

The monitor electrode 331 is disposed on the first major surface 71 of the solid electrolyte body 70 on which the electrodes 21 and 41 are arranged. The monitor electrode 331 is located downstream away from the diffusion controlling portion 50 and the pump electrode 41 in the gas flow direction F and also away from the sensor electrode 21 in the direction P perpendicular to the sensor electrode 21. The monitor electrode 331 is opposed to a portion of the reference electrode 80 through a portion of the solid electrolyte body 70 and placed in substantially the same condition of exposure to the measurement gas as in the sensor electrode 21 arranged in the perpendicular direction P.

Figure 9:
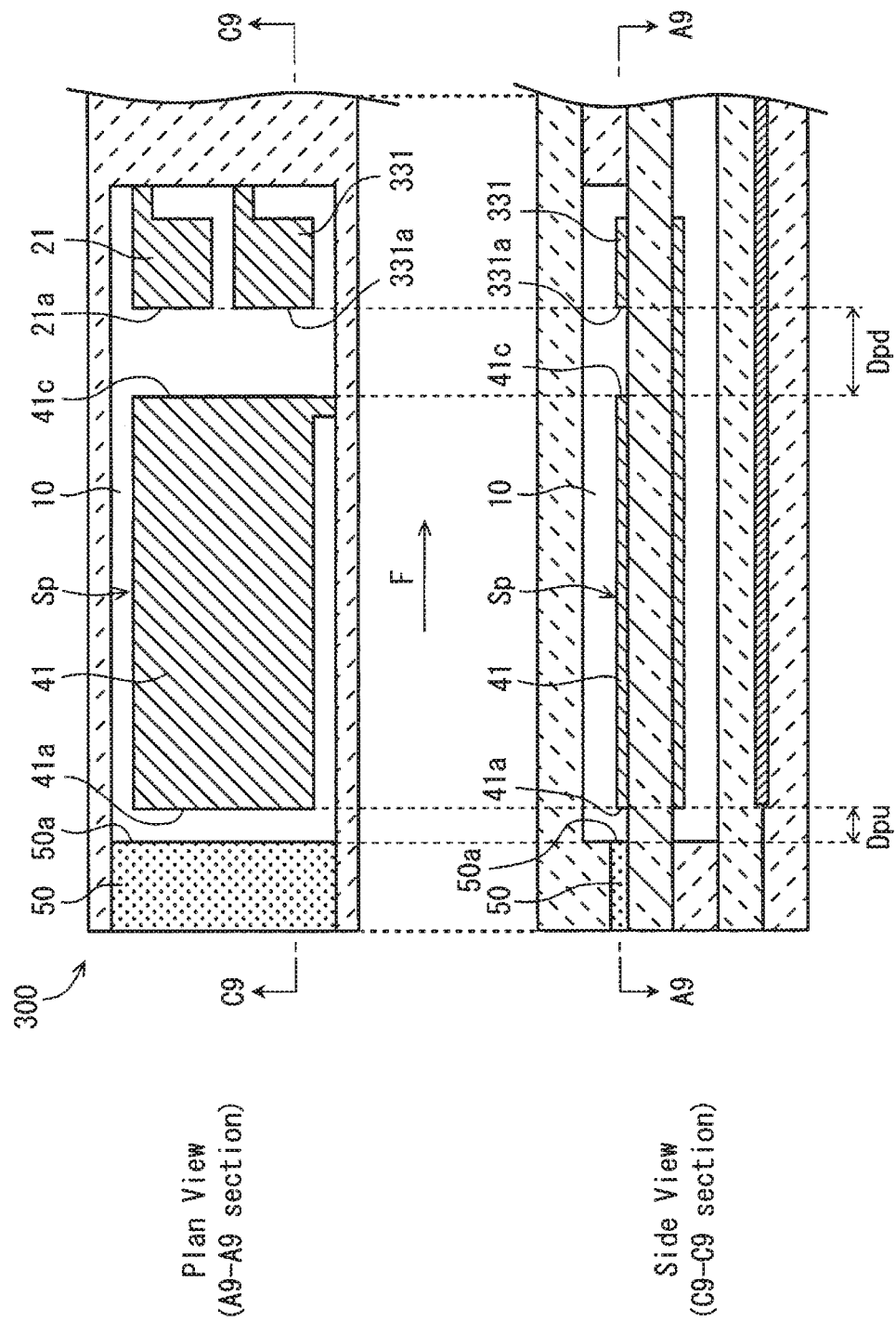
FIG. 9 is a sectional view which represents a positional relation among component parts of a gas sensor device in the third embodiment.

The distance at which the downstream end surface 41c of the pump electrode 41 is away upstream from the upstream end surface 331a of the monitor electrode 331 in the gas flow direction F is, as illustrated in FIG. 9, the distance Dpd that is substantially the same as in the sensor electrode 21. In other words, the pump electrode 41 is arranged upstream of the monitor electrode 331 and the sensor electrode 21 in the gas flow direction F and located at the place Sp at the distance Dpd from the electrodes 331 and 21. The upstream end surface 331*a* of the monitor electrode 331 and the upstream end surface 21*a* of the sensor electrode 2 are, therefore, arranged at the same interval away from the downstream end surface 50*a* of the diffusion controlling portion 50 as well as away from the downstream end surface 41*c* of the pump electrode 41.

With the above arrangements, the monitor electrode 331, as illustrated in FIG. 8, has the lead 332 extending downstream in the gas flow direction F. The lead 332 is connected to the sensor control circuit 106 through the sensor harness 105.

With the above arrangements, the monitor cell 330 functions to perform an oxygen concentration measuring operation for correction of the concentration of NOx in the measurement gas. Specifically, the sensor control circuit 106 applies a controlled voltage between the electrodes 331 and 80 of the monitor cell 330. Upon application of such a voltage, oxygen molecules in the measurement gas entering the measurement gas chamber 10 are adsorbed by the exposed noble-metal surface of the monitor electrode 331 and then reduced, so that they are decomposed into oxygen ions. The oxygen ions are then transmitted from inside the monitor electrode 331 into the solid electrolyte body 70 and then to the reference electrode 80. The oxygen ions are measured in the form of a monitor current. The concentration of oxygen in the measurement gas is, therefore, determined as a function of the magnitude of the monitor current.

The monitor cell 330, therefore, outputs to the sensor control circuit 106 the monitor current whose value corresponds to the concentration of oxygen remaining in the measurement gas whose concentration of oxygen has been regulated by the pump cell 40. Simultaneously, the sensor cell 20 outputs to the sensor control circuit 106 the sensor current whose value corresponds to a before-corrected concentration of NOx which is expected to contain the concentration of oxygen which still remains in the measurement gas after regulated by the pump cell 40 and is higher than zero. The sensor control circuit 106 is responsive to the above outputs to 17 to calculate the remaining concentration of oxygen and the before-corrected concentration of NOx as results of measurements thereof. The sensor control circuit 106 performs correction by subtracting the residual concentration of oxygen from the before-corrected concentration of NOx to calculate the concentration of NOx from which an error arising from the residual concentration of oxygen is removed as a result of the measurement.

In the third embodiment, reach and adhesion of Au, as evaporated from the pump electrode 41 located upstream in the gas flow direction F, to the monitor electrode 331 which is arranged adjacent the sensor electrode 21 in the direction P perpendicular to the gas flow direction F and formed on the first major surface 71 of the solid electrolyte body 70 is minimized in the same way as the sensor electrode 21. Therefore, upon application of voltage to the monitor electrode 331 of the monitor cell 330, the monitor cell 330 works to measure the concentration of oxygen remaining in the measurement gas after regulated by the pump cell 40, thereby enabling the accuracy in correcting the concentration of NOx measured by the sensor cell 20 to be improved. If the evaporation of Au from the pump electrode 41 results in a variation in ability of the pump cell 40 to measure the concentration of oxygen, the monitor cell 330 is capable of measuring the concentration of oxygen remaining in the measurement gas, thus ensuring the improvement of accuracy in correction of the concentration of NOx.

Other Embodiments

While the some embodiments have been described above, the invention should not be limited thereof, it should be appreciated that the invention can be embodied in various ways without departing from the principle of the invention.

Figure 10:
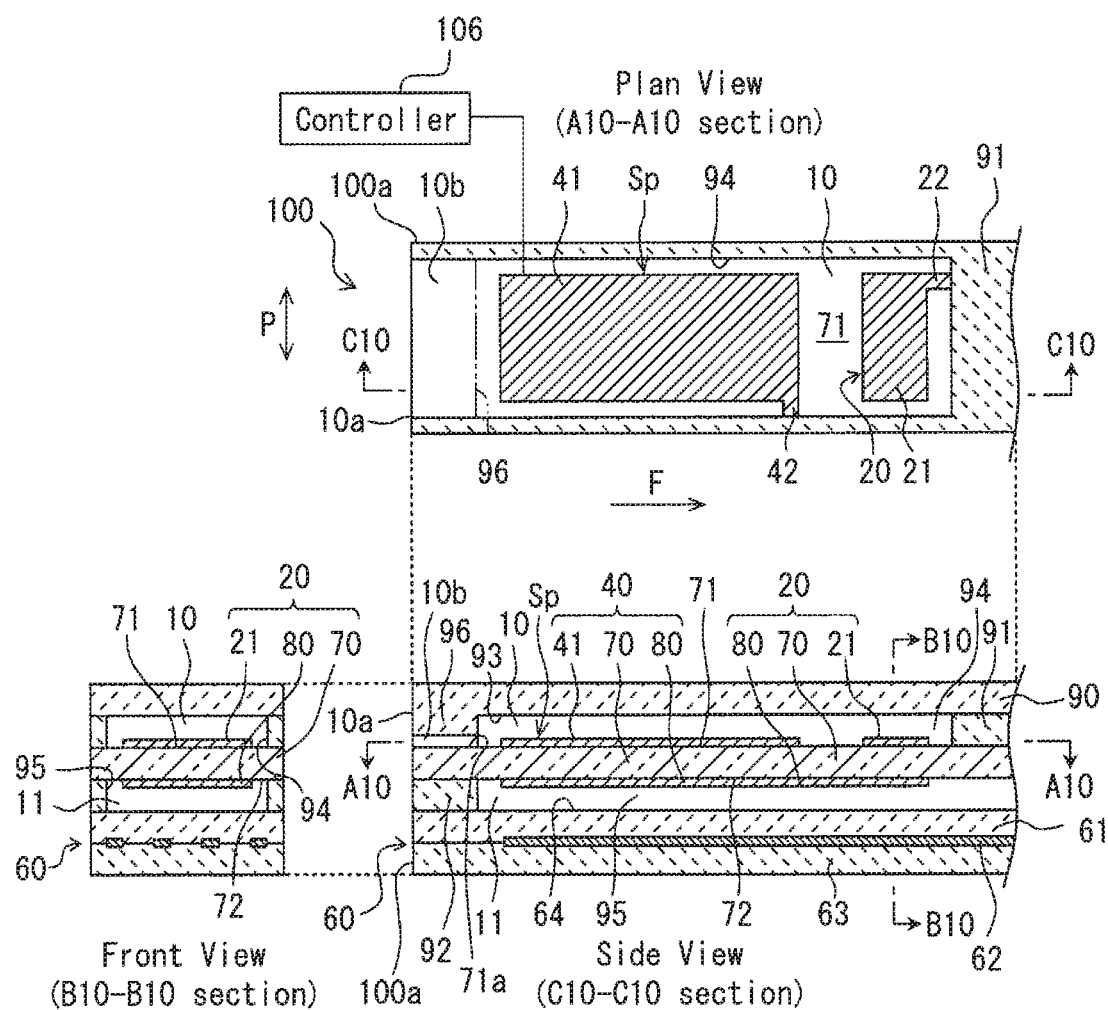
FIG. 10 is a sectional view which illustrates a modification of FIG. 2.
Figure 11:
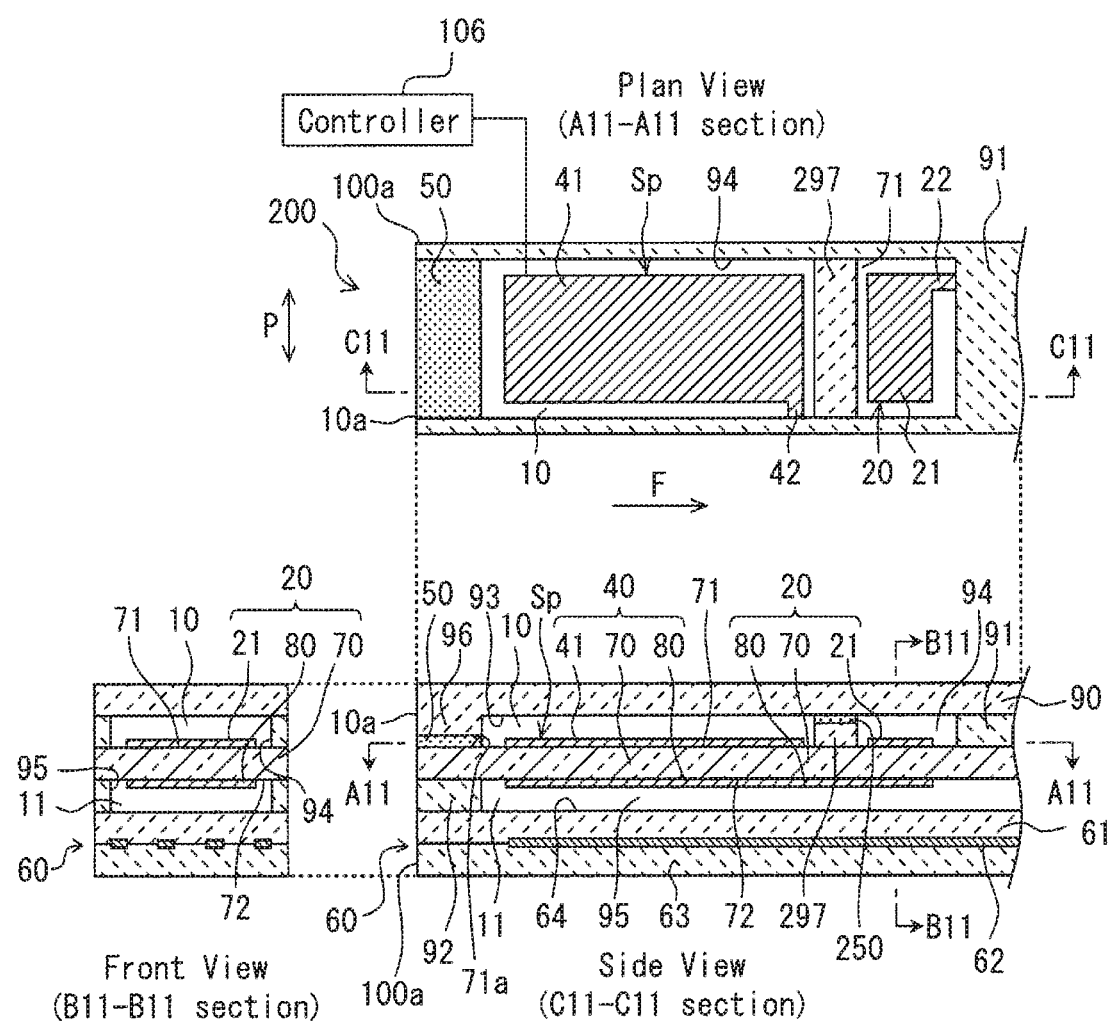
FIG. 11 is a sectional view which illustrates a modification of FIG. 7.

As a modification 1 of the first to third embodiment, an air gap which is defined between the closing wall 96 and the first major surface 71, that is, faces the first major surface 71, as illustrated in FIG. 10 (i.e., the modification 1 of the first embodiment), may be, like the air gap 210*b* in the second embodiment, serves as the diffusion controlling portion 10*b*. As a modification 2 of the second embodiment, a diffusion controlling layer which is made of a porous material, like the diffusion controlling portion 50, may be, as illustrated in FIG. 11, disposed as the diffusion controlling portion 250 instead of the air gap 210*b* to control the rate of diffusion between the protruding wall 297 and the second surface 93.

As a modification of the first to third embodiment, the exhaust gas may be introduced as the measurement gas into the measurement gas chamber 10 from an EGR path diverging from the exhaust path 2 of the internal combustion engine or a portion of an intake path of the internal combustion engine which is located downstream of a joint of the intake path and the EGR path As a modification 4 of the first to third embodiment, the heater 62 may be designed to heat the pump cell 40 and the sensor cell 20 so as to increase the temperature of the pump electrode 41 to be lower than or substantially identical with that of the sensor electrode 21.

As a modification 5 of the first to third embodiment, the distance Dpd between the pump electrode 41 and the sensor electrode 21 may be selected to be less than 0.3 mm or more than 0.7 mm. A modification of 6 is implemented by a combination of the second and third embodiment.

A modification 7 of the first to third embodiment, the sensor control circuit 106 only for use with the gas sensor devices 100, 200, and 300 may be omitted. For instance, an ECU for internal combustion engines may alternatively be used to control the application of voltage to the gas the sensor electrode 21, the pump electrode, and the monitor electrode 331. In the modification 7, it is desirable to use an ECU located as close to the gas sensor device 100, 200, or 300 as possible for the voltage application.

As a modification 8 of the first to third embodiment, the reference electrodes 80 may be prepared one for each of the cells 20, 40, and 330. As a modification 9 of the first to third embodiment, an adsorption layer which works to adsorb Au may be disposed on the first major surface 71 or the second surface 93.

What is claimed is:

1. A gas sensor device comprising:
   a solid electrolyte body which has a major surface;
   a measurement gas chamber which is defined by said major surface and in which a measurement gas flows in a gas flow direction;
   a diffusion controlling portion which is formed to face said major surface and works to control a rate of diffusion of the measurement gas entering said measurement gas chamber;
   a pump cell which has a pump electrode which contains gold and is formed on said major surface, the pump electrode being located downstream of the diffusion controlling portion in the gas flow direction, the pump cell working to regulate a concentration of oxygen in the measurement gas upon application of voltage to the pump electrode; and a sensor cell which has a sensor electrode formed on said major surface downstream of the diffusion controlling portion in the gas flow direction, the sensor cell working to measure a concentration of nitrogen oxide contained in the measurement gas upon application of voltage to the sensor electrode, wherein:

the pump electrode is disposed at a place which is located upstream of the sensor electrode and at a distance of 0.2 mm or more downstream away from the diffusion controlling portion in the gas flow direction; and the distance of the pump electrode downstream away from the diffusion controlling portion in the gas flow direction is smaller than the distance of the pump electrode upstream away from said sensor electrode in the gas flow direction.

2. A gas sensor device comprising:

a solid electrolyte body which has a major surface;

a measurement gas chamber which is defined by said major surface and in which a measurement gas flows in a gas flow direction;

a diffusion controlling portion which is formed to face said major surface and works to control a rate of diffusion of the measurement gas entering said measurement gas chamber;

a pump cell which has a pump electrode which contains gold and is formed on said major surface, the pump electrode being located downstream of the diffusion controlling portion in the gas flow direction, the pump cell working to regulate a concentration of oxygen in the measurement gas upon application of voltage to the pump electrode; and a sensor cell which has a sensor electrode formed on said major surface downstream of the diffusion controlling portion in the gas flow direction, the sensor cell working to measure a concentration of nitrogen oxide contained in the measurement gas upon application of voltage to the sensor electrode, wherein:

the pump electrode is disposed at the place which is located upstream of the sensor electrode and at a distance of 0.2 mm to 0.3 mm downstream away from the diffusion controlling portion in the gas flow direction; and the distance of the pump electrode downstream away from the diffusion controlling portion in the gas flow direction is smaller than the distance of the pump electrode upstream away from said sensor electrode in the gas flow direction.

* * * * *